Feb. 5, 1957            D. S. BAILEY            2,779,998
METHOD OF FORMING A MECHANICAL AND ELECTRICAL CONNECTION
Filed Jan. 30, 1952
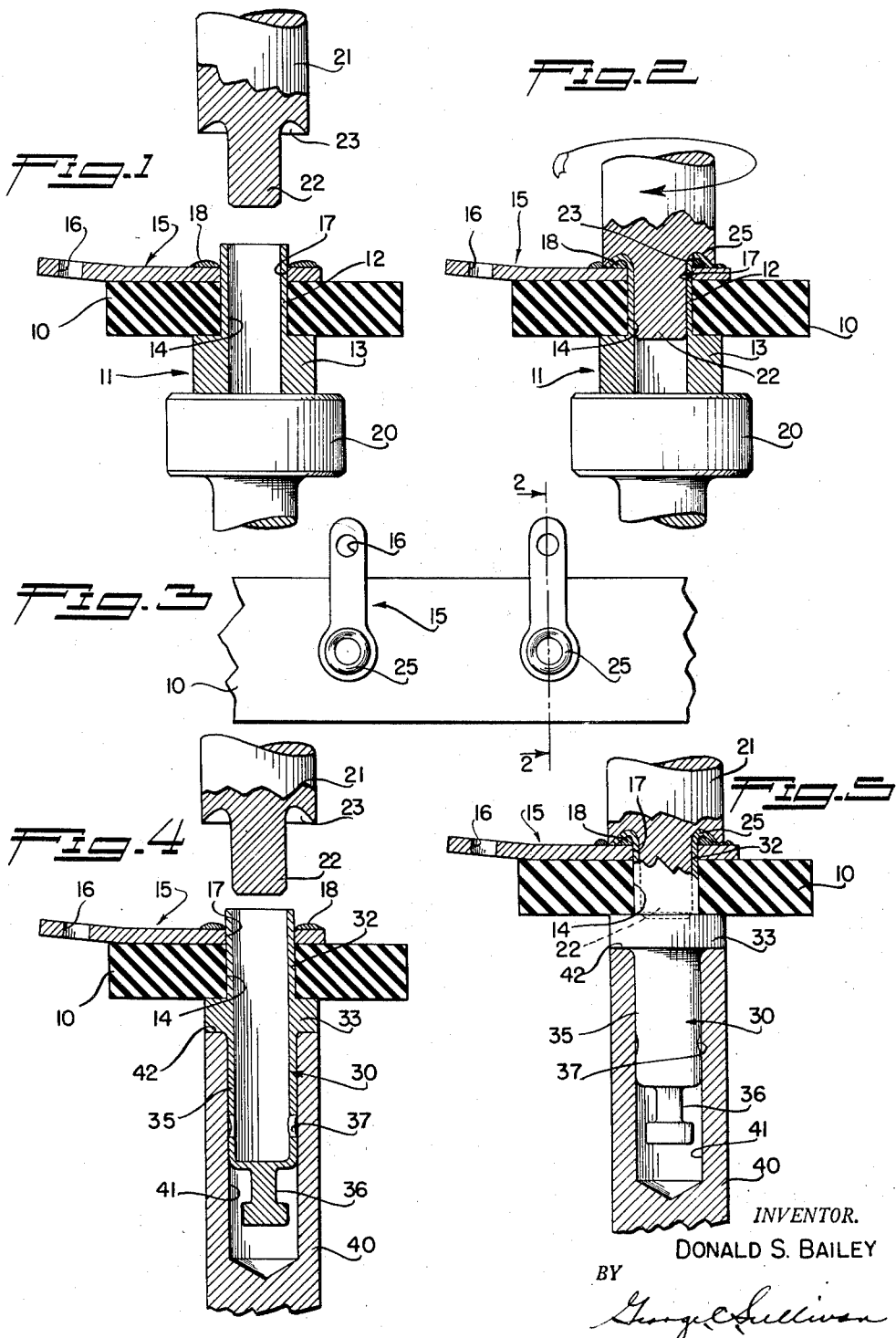
INVENTOR.
DONALD S. BAILEY
BY
George C. Sullivan
Agent

United States Patent Office 2,779,998
Patented Feb. 5, 1957

2,779,998

METHOD OF FORMING A MECHANICAL AND ELECTRICAL CONNECTION

Donald S. Bailey, Highway Highlands, Calif., assignor to Lockheed Aircraft Corporation, Burbank, Calif.

Application January 30, 1952, Serial No. 269,093

2 Claims. (Cl. 29—470.3)

This invention relates to electrical apparatus generally and relates more particularly to the mechanical and electrical attachment and bonding of parts of electrical and electronic equipment.

In assembling and installing electrical and electronic parts and equipment, it is often necessary to join two members or parts by means of both a mechanical connection and an electrical bond. For example, when installing the various types of turret terminals it is necessary to attach solder lugs to the terminals, the service requirements usually being such that the lugs must be mechanically fastened to the terminals so as to be rigid therewith and also electrically bonded to their respective terminals by solder, or the like. In the past, it has been the usual practice in such cases to make the mechanical attachment of the log to its terminal in one operation and then solder the lug and terminal together by means of a soldering iron to effect the required electrical bond. In addition to these two separate or distinct operations, it is often necessary to remove the excess solder remaining after the soldering operation, this being mandatory where the terminal is socketed or tubular to receive a plug or jack and unwanted solder has entered the bore of the terminal. These several operations are tedious and time consuming and, therefore, costly.

It is an object of this invention to provide a simple, rapid and commercially practical method for mechanically connecting and soldering together parts in a single operation. An exemplary application of the invention is the attaching of a solder lug to a terminal which is accomplished by the method of the invention in a single spinning-soldering operation. The one simple and rapid operation replaces the two separate and time consuming operations that were previously employed; namely the mechanical attachment of the lug to the terminal and the subsequent soldering of the lug to the terminal.

Another object of the invention is to provide a method of this character that results in a clean symmetrical connection without excessive or unwanted solder. The method cannot result in unwanted solder being deposited in the tubular or socketed terminal or at other points where it may interfere with the intended use of the equipment.

Another object of the invention is to provide a method for attaching or connecting parts wherein a superior electrical bond is obtained. The soldered electrical bond is clean and uniform and has the solder directly engaged or bonded with the metals of the two parts to provide a good electrical path therebetween.

A further object of the invention is to provide a mechanical and electrical joint or connection that is mechanically or physically strong to effectively resist the effects of vibration, shock, etc. and that incorporates a continuous uniform and protected soldered bond or connection between the parts. The soldered union in the attachment of the invention is under or within a bead or rolled flange spun on one part to be housed and protected therein.

Other objectives and features of the invention will become apparent from the following detailed description of typical manners of performing the same, reference being had to the accompanying drawings wherein:

Figure 1 is a fragmentary vertical sectional view illustrating a solder lug in position on a terminal preparatory to being secured thereto;

Figure 2 is a view similar to Figure 1 showing the spinning tool in position at or near the termination of its operation of securing or attaching the lug to the terminal;

Figure 3 is a reduced fragmentary plan view showing two terminal and lug assemblies secured on a terminal panel with line 2—2 indicating the plane of sectioning Figure 2;

Figure 4 is a view similar to Figure 1 showing the lug applied to another form of turret terminal; and Figure 5 is a view similar to Figure 2 showing the lug attached to the terminal of Figure 4.

Before explaining in detail the present invention and the method embodied therein, it is to be understood that the invention is not to be limited in its application to the details of construction and arrangement of parts illustrated in the accompanying drawings since the invention is capable of other embodiments and of being practiced in various ways. Also, it is to be understood that the phraseology or terminology employed herein is for the purpose of description and not of limitation and it is not intended to limit the invention beyond the terms of the claims or the requirements of the prior art.

In Figures 1, 2 and 3, I have illustrated a member 10 of dielectric material, such as a terminal board, or the like, and have shown an electrical terminal 11 associated therewith. This particular terminal 11 is a tubular metal part and has, what I will term, a stem or shank 12 and a flange or head 13. The shank 12 is arranged through an opening 14 in the terminal board 10 and is sufficiently long to project beyond one surface of the board when the head 13 engages against the opposite surface. The lug 15, to be secured on the terminal 11, may be of conventional design or of any special or selected configuration. As illustrated, the lug 15 is an elongate part formed of relatively thin metal and has an opening 16 adjacent its outer end for receiving a wire, or the like. An opening 17 is provided in the inner end portion of the lug 15 and is adapted to receive the projecting part of the terminal shank 12 when the lug is assembled in place, as shown in Figure 1. It is to be observed that the shank 12 is sufficiently long to extend upwardly some distance beyond the lug 15. The several surfaces of the lug 15 may or may not be tinned with solder at the time of its manufacture but in accordance with the invention a body 18 of solder is provided on the upper surface of the lug adjacent or around the opening 17. The solder 18 is preferably provided on the lug 15 at the time of its manufacture so the lug is in condition for immediate use when it is to be applied to the terminal. If preferred, however, the solder 18 may be provided on the lug shortly or immediately prior to assembling the lug on the terminal 11. This body of solder 18 is preferably annular to completely surround the opening 17 and in most cases need not be very large in volume.

In performing or carrying out the method of the invention the terminal 11 is arranged as illustrated in Figure 1 to have its head 13 against one side of the board 10 and to have its shank 12 project upwardly through the opening 14. The lug 15 is then arranged in place on the terminal board 10 with the terminal shank 12 projecting upwardly through its opening 17. The lug 15 is positioned to have its body of solder 18 on its upper or exposed side. The end of the terminal head 13 is then engaged with an abutment or spinning rest 20 and a spinning tool 21 is moved toward the terminal. The tool 21 has a reduced stem 22 for entering the tubular terminal shank 12 with working clearance and has a shoulder 23 for shaping or spinning down the protruding upper end of the terminal shank. The shoulder 23 faces toward the terminal board 10 and is concave and shaped to form a bead or flange 24 of the desired configuration on the upper end of the terminal 11.

The tool 21 is rotated and fed downwardly against the protruding end portion of the terminal shank 12, the stem 22 entering the shank 12 and the shoulder 23 engaging downwardly against the end of the shank. The abutment or rest 20 holds the terminal against downward movement or displacement. The stem 22 serves to hold or support the tubular shank 12 against internal distortion while the shoulder 23 turns the upper portion of the shank outwardly and then downwardly to constitute the bead or flange 25. The bead or flange 25 may preferably be formed sufficiently to have its lower edge or periphery bear downwardly against the upper surface of the lug 15 to securely mechanically attach the lug to the assembly of the board 10 and terminal 11, this engagement serving to clamp the head 13 of the terminal tightly against the lower surface of the board 10 so that the terminal and lug are rigidly and securely held in place.

The shaping or spinning of the flange 25 is accompanied by heating of the metal of the terminal at the flange and adjacent thereto, the frictional contact of the tool 21 with the relatively stationary terminal generating substantial heat. The tool 21 is rotated at a sufficiently high rate of speed and is fed downwardly in such a manner that this heat is generated rather rapidly. The heat is transferred through the thin wall of the bead 25 to heat and liquify the solder 18. In actual practice the workman may observe the solder at the exterior of the flange 25 and determine when the solder 18 has become sufficiently plastic or liquid to assure a good bond with the metal of the flange. The molten or liquified solder 18 bonds with the under surface of the flange 25 and, of course, with the surface of the lug 15 to provide the electrical bond between the terminal and lug.

Following the spinning-soldering operation the tool 21 is raised or removed to complete the method or operation. It is to be observed that the opening in the tubular shank 12 of the terminal 11, which may later be used to receive a jack or plug, is left free and clear and that little or no excess solder is left on the lug 15. The volume of the solder 18, as initially provided on the lug 15, may be related to the shape and size of the spun flange 25 to completely occupy the annular space defined by the flange with little or no excess. It will be seen that this solder 18 under the flange 25 is protected and confined in such a manner as to have direct intimate contact with the metals of the flange 25 and lug 15. From the foregoing description of the method it will be observed that a single step or operation serves to both mechanically connect and electrically bond the terminal 11 and lug 15.

Figures 4 and 5 of the drawings illustrate the manner of employing the method of the invention in securing the lug 15 on a slightly different type of turret terminal 30. This terminal 30 is similar to the terminal 11, described above, in that it has a head 33 for bearing against one side of the terminal board 10, or the like, and has a shank 32 for extending upwardly through the opening 14 in the board 10 to protrude beyond the upper surface of the lug 15. This type of terminal 30 has a lower stem or shank 35 extending downwardly from the head 33 and provided with a reduced neck 36 for facilitating the securing of a wire, or the like, thereto. This stem 35 may also have a transverse opening 37 for receiving a wire.

In employing the method of the invention in connection with the terminal 30 of Figures 4 and 5, the spinning tool 21 may be the same as described above and the lug 15 has the annular body of solder 18 surrounding the opening 17 to be around the protruding portion of the terminal shank 32. In this case the abutment or rest 40 has a central socket 41 for receiving the stem 35 of the terminal and the upper end 42 of the rest is engageable with the under side of the head 33 to support the terminal against downward movement during the spinning operation. The spinning-soldering operation is performed as above described, the tool 21 being rotated and fed downwardly so that its shoulder 23 forms the bead or flange 25 on the upper end of the terminal while at the same time frictionally heating the same so that the body of solder 18 is made liquid or semi-liquid to bond with the surfaces of the flange and lug 15. At the completion of this operation the spinning tool 21 is raised or removed and the terminal 30 is disengaged from the rest 40. As in the case described above, the single spinning-soldering operation results in a strong rigid mechanical attachment of the lug 15 and terminal 30 and a good continuous annular electrical bond is provided by the body of solder 18 directly and intimately in contact with the metal of the flange 25 and lug 15. Again the method leaves the interior of the socketed or tubular terminal 30 free and clear of solder and ready for the reception of a plug, or the like.

Having described only typical forms of the invention I do not wish to be limited to the specific details herein set forth, but wish to reserve to myself any variations or modifications that may appear to those skilled in the art and fall within the scope of the following claims.

I claim:

1. The method of forming a mechanical and electrical connection between a first part having a solder-coated surface and having an opening therethrough and a second part having a tubular portion protruding through said opening which comprises spinning said tubular portion into the from of a flange which has its peripheral edge cutting into the solder coating on said surface and which edge faces in a general direction reverse to that direction the peripheral edge faced prior to spinning; and simultaneously heating the flange to melt the solder on said surface to fuse the same with the flange by advancing a spinning tool against said tubular portion while holding the parts against relative movement and while rotating said tool at a sufficiently high speed to generate frictional heat in the flange to melt the solder as the flange is spun against said solder-coated surface, and upon melting of said solder, ceasing the spinning operation, whereupon the solder cools and sets up to bond said first part to said second part.

2. The method of forming a mechanical and electrical connection between a first part having a solder-coated surface and having an opening therethrough and a second part having a tubular portion protruding through said opening which comprises spinning said tubular portion into the form of a flange which has its peripheral edge cutting into the solder coating on said surface so as to leave an outside marginal area of solder about said peripheral edge and which edge faces in a general direction reverse to that direction the peripheral edge faced prior to spinning; and simultaneously heating the flange to melt the solder on said surface to fuse the same with the flange by advancing a spinning tool against said tubular portion while holding the parts against relative movement and while rotating said tool at a sufficiently high speed to generate frictional heat in the flange to melt the solder as the flange is spun against said solder-coated surface, observing the marginal area of solder about said peripheral edge to determine when said solder melts, and ceasing the spinning operation when sufficient melting is observed, whereupon the solder cools and sets up to bond said first part to said second part.

References Cited in the file of this patent

UNITED STATES PATENTS

| | | |
|---|---|---|
| 444,721 | Bevington | Jan. 13, 1891 |
| 2,354,081 | Weder | July 18, 1944 |
| 2,399,356 | Klopstock | Apr. 30, 1946 |
| 2,435,603 | Rickmeyer | Feb. 10, 1948 |
| 2,494,137 | Martines | Jan. 10, 1950 |
| 2,550,174 | Towner | Apr. 24, 1951 |
| 2,572,956 | Servis | Oct. 30, 1951 |
| 2,679,090 | Farr | May 25, 1954 |

FOREIGN PATENTS

| | | |
|---|---|---|
| 476,480 | Germany | Feb. 7, 1925 |